May 13, 1969    H. G. ROGERS    3,443,859
VARIABLE LIGHT-FILTERING DEVICE
Filed March 9, 1964    Sheet 1 of 2

INVENTOR.
Howard G Rogers
BY Brown and Mikulka
and
Alvin Isaacs
ATTORNEYS

United States Patent Office 3,443,859
Patented May 13, 1969

3,443,859
VARIABLE LIGHT-FILTERING DEVICE
Howard G. Rogers, Weston, Mass., assignor to
Polaroid Corporation, Cambridge, Mass., a
corporation of Delaware
Filed Mar. 9, 1964, Ser. No. 350,251
Int. Cl. G02f 1/28, 1/36; G02b 5/24
U.S. Cl. 350—160                              13 Claims

ABSTRACT OF THE DISCLOSURE

A variable light-transmitting device is provided which comprises, in an electrolytic system, a permanently positioned non-migratory material having reversibly alterable spectral absorption characteristics and migratory means activated by the flow of an electic current capable of altering the spectral absorption characteristics of said material whereby the desired changes in optical density or spectral absorption characteristics of the device may be obtained.

---

This invention relates to novel systems employing an electrolytic solution to effect a change in the spectral absorption characteristics of a material having reversibly alterable spectral absorption characteristics and, more particularly to novel light filters, variable density windows, and electrolytic photographic systems employing the same.

A primary object of this invention is to provide a novel system for transmitting light under controlled conditions.

Another object is to provide a novel variable light filter.

Still another object is to provide a novel variable density window.

Yet another object is to provide a non-glare and fog-penetrating headlamp for vehicles.

A further object is to provide novel systems for image recordation and image translation.

A still further object is to accomplish the aforementioned objectives by providing a novel reversible system wherein the spectral absorption characteristics of a non-migratory material are altered instantaneously and automatically as a function of the direction of the flow of current from suitable source.

Other objects of the invention will in part be obvious and will in part appear hereinafter.

The invention accordingly comprises the process involving the several steps and the relation and order of one or more of such steps with respect to each of the others, the apparatus possessing the features, properties and the relation of components, and the product possessing the features, properties and the relation of elements which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
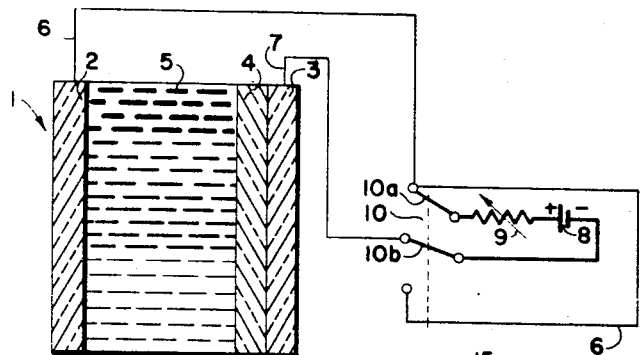
FIGURE 1 is a diagrammatic view illustrating one embodiment of the variable filter of this invention.

Various systems utilizing an electric current passing through an electrolytic solution to effect a change in the optical density or spectral absorption characteristics of a substance have heretofore been known in the art. For example, systems involving metal-plating and unplating at one of the electrodes have heretofore been suggested. It has also been suggested to employ an electrolytic solution of a pH-sensitive material which changes color or becomes colored upon a change in pH initiated by passing a current through the solution. Generally speaking, the common denominator of such systems is a combination of elements containing a pair of electrodes separated by a suitable electrolyte, a source of current, and some material or materials which may initially be present in the electrolyte and which, upon impressing a suitable current, will deposit on one of the electrodes to effect a change in the optical density or light-filtering properties of the system, e.g., metal plating, or color change, change from a color to colorless, or change from colorless to a color, e.g., pH sensitive dyes, dye bleach processes, etc.

Such systems generally suffer from at least one of the following shortcomings: too slow; not stable; not reversible; not automatically or fully reversible; not uniform or consistent throughout the system, particularly over large areas.

The present invention is directed to a novel variation in procedure seeking to obviate the aforementioned difficulties.

According to the present invention, the desired changes in optical density or spectral absorption characteristics are obtained by providing an electrolytic system containing at least one permanently positioned non-migratory material itself having reversibly alterable spectral absorption characteristics or which is capable of reacting with a migratory material to provide a reversible change in spectral absorption characteristics or optical density in said system.

The term "non-mitgratory material" connotes a material which is substantially fixed in its position with respect to the arrangement of elements with which it is associated and which will not move or migrate, e.g., in solution, away from its position. Conversely, the term "migratory material" connotes a material which is not substantially fixed in its position, but is free to move, e.g., in solution, or change its position.

The term "material having reversibly alterable spectral absorption characteristics" connotes a material which in one environment or under one set of conditions is transparent or posses a color or absorbs at least a portion of the light of the visible spectrum and which is reversibly capable in a given different environment or under a given other set of conditions of changing its spectral absorption characteristics. Included within the scope of the term "material having reversibly alterable spectral absorption characteristics" are materials which can repeatedly change from colorless to a color or vice versa or from one color to another and back again under appropriate conditions or environment or by reversibly alterable changes in their chemical structure, and materials which can repeatedly change their covering power, e.g., from light-transmittant to light-absorbent.

A wide variety of different classes of materials possess reversibly alterable, spectral absorption characteristics or can provide different spectral absorption characteristics by reversible chemical reactions forming different materials.

One class of useful materials comprises chemical compounds whose spectral absorption characteristics are determined by the pH of the environment, e.g., so-called pH or acid-base indicators. As examples of such compounds, mention may be made of phenolphthalein which changes from colorless in an acid medium to pink in a basic medium; Malachite Green which changes from green to colorless; Quinaldine Red which changes from colorless to red; o-cresolphthalein which changes from colorless to red; nitrophenol which changes from colorless to yellow, etc.

Another class of useful materials comprises chemical compounds which are capable of being alternatively or reversibly reduced and oxidized and which exhibit spectral absorption characteristics in the reduced state different from those exhibited in the oxidized state. As examples of such compounds, mention may be made of leuco dyes which are typically colorless in the reduced state and colored in the oxidized state; oxidation-reduction indicators such as Erioglaucin A; Phenosafranine, naphthidine, 2.2′-dipyridyl ferrous ion; N-phenyl-anthranilic acid, triazolium and tetrazolium salts, etc.

It will be appreciated that the aforementioned classes of compounds will exhibit different spectral absorption characterisics at the anode than they will at the cathode. In other words, acidic ions will migrate to the anode and basic ions to the cathode. Thus the anode will become an acidic environment and the cathode a basic environment. In like manner, oxidation reactions will occur at the anode while reduction reactions will occur at the cathode.

As will be more apparent hereinafter in the description of the illustrative drawings, if compounds of the foregoing description are positioned and rendered non-migratory adjacent one of the electrodes, and the flow of current is controlled so this electrode may be either the anode or the cathode, the spectral absorption characteristics of the compound will be determined by the direction of the flow of current.

These compounds may be so positioned and rendered non-migratory in a variety of different manners. They may be applied as a coating in a non-migratory matrix or coating material. The compound molecules may also be so large as to be non-migratory in the electrolyte solution. If the compound molecules are not per se large enough to be non-migratory, they may be rendered so by attaching the compound to a bulky non-migratory molecule. This may be accomplished by polymerization to provide a non-migratory polymer containing recurring radicals of the aforementioned compounds.

As examples of useful non-migratory polymers, mention may be made of 5-nitrosalicylaldehyde partial acetal of polyvinyl alcohol which changes from colorless to yellow in basic medium; 3′-formyl-phenolphthalein partial acetal of polyvinyl alcohol which changes from colorless to red in a basic medium, etc. These polymers are described and claimed in copending application Ser. No. 350,572 (now abandoned) filed concurrently herewith in the name of Howard C. Haas.

Another class of useful materials comprises metals or metal-containing compounds which are anchored or otherwise rendered non-migratory at one of the electrodes and which possess a given optical density or spectral absorption characteristics which may be altered by the flow of ions in the electrolyte. For example, metal ions of a given density may be suitably anchored at the anode so as to be non-migratory when current is impressed upon the system. However, when current flows, the anions, e.g., $Cl^-$, $SO_4^-$, etc., migrating to the anode convert the metal ions to the corresponding salt which may be colorless or of a differene color. When the flow of current is reversed, the reaction likewise reverses as the anions migrate to the other electrode. By way of illustration, the covering power of lead may be altered in this manner by converting it to a salt, e.g., lead sulfate, or to lead oxide.

A further class of useful materials are molecularly oriented plastic sheet materials which can be stained by a staining material, e.g., iodite salts, etc., in the electrolyte solution to render the plastic sheet material light-polarizing. Reversing the flow of current destains and thus destroys the light-polarizing properties of the plastic material. Systems utilizing plastic materials of this description are described and claimed in copending application Ser. No. 350,250 filed concurrently herewith in the names of Edwin H. Land and Howard G. Rogers.

Examples of non-migratory materials which will react with a migratory material to change the spectral absorption characteristics of the migratory material are acidic materials, which will react with metal ions to form a salt of different power than the metal. Materials of this nature will be described with more particularity in the following description of the illustrative drawings.

Other useful non-migratory materials will be readily suggested to those skilled in the art in the light of the foregoing description.

The use of these non-migratory materials in the practice of this invention will be more readily understood by reference to the drawings.

As shown in FIGURE 1, the variable light filter or light transmission controlling means 1 comprises a pair of electrodes 2 and 3 which are at least translucent and are preferably substantially transparent to light; and a non-migratory material or mixture of such materials 4 such as has been described heretofore positioned adjacent one of the electrodes. (For purposes of illustration, material 4 is shown to be adjacent to electrode 3.) An electrolytic solution 5 establishes electrical contact between the two electrodes.

The electrodes 2 and 3 may comprise any of the transparent electrodes heretofore known in the art, e.g., transparent bases having a thin coating of a conducting metal such as gold, fine mesh screens of one of the noble metals, electrically conducting glass, such as Nesa (trademark of Pittsburgh Plate Glass Co., for an electrically conductive transparent glass), Electrapane (trademark of Libby-Owens-Ford Glass Co. for an electrical conducting glass coated with a transparent conducting oxide film that is 0.0002 in. thick), etc.

Electrolytic solution 5 comprises at least a solution of an ionizable material such as an inorganic chloride, sulfate, etc., which is capable, upon impressing a suitable electric current, of providing ions which will effect the desired change in covering power or spectral absorption characteristics of material 4. The solvent may be water or an organic liquid such as propylene glycol, or a mixture of such solvents. If desired, the electrolytic solution may also contain viscous reagents such as carboxymethyl cellulose, hydroxyethyl cellulose, etc., to increase its viscosity.

Electrodes 2 and 3 are connected to a suitable source of electric current by leads 6 and 7, respectively. As shown in FIGURE 1, the source of current may comprise a battery 8. Resistor 9 is preferably but not necessarily provided in order to regulate the amount of current. The terminal ends of leads 6 and 7 make contact with double switch 10 to complete the circuit.

In operation, when the switch is in the "up" position, as shown in FIGURE 1, the current is caused to flow from the battery through switch 10a to lead 6 whereby electrode 2 becomes the anode and electrode 3 the cathode. This in turn causes anions to flow towards electrode 2 and cations to flow towards electrode 3. Switch 10b of course makes contact with lead 7 to complete the circuit. Electrode 2 thus becomes an acidic environment which permits oxidation reactions of the character heretofore described to be performed.

Conversely, electrode 3 becomes a basic or alkaline environment which permits reduction reactions of the character heretofore described to be performed. Thus, for example, if material 4 contains one of the acid-base indicators heretofore described which are colorless in an acid medium and provide a color in a basic medium, by impressing a current in the manner illustrated in FIGURE 1, a colored filter is obtained When switch 10 is reversed, e.g., drawn into the "down" position as viewed in FIGURE 1, the flow of current is reversed so that current now flows from switch 10a through lead 7 to electrode 3, which in turn reverses the polarity of the two electrodes, causing the anions and cations to migrate to the opposite electrodes. This in turn causes electrode 3 to change from an alkaline to an acid environment, thereby causing material 4 to change color or to change from a color to colorless, depending of course upon the particular material employed.

While the direction of current may be controlled manually, it may also be controlled automatically, e.g., by means such as illustrated in the bottom portion of FIGURE 1. As is shown, this automatic means may comprise a solenoid 11, photoconductive cell 12, battery or other source of current 13 and a resistor 14 connected in series by means of leads 15, 16, 17 and 18, respectively.

As is well known in the art, cell 12 and resistor 14 cooperate to control the amount of current flowing to solenoid 11. When the current is of a predetermined amount, e.g., when photoconductive cell 12 records a relatively low intensity of light, solenoid 11 causes switch 10 to drop to the "down" position, thereby reversing the direction of the flow of current. It will be appreciated that switch 10 is provided with suitable mechanical means whereby it is maintained normally in the "up" position, so that when cell 12 records a relatively high intensity of light, solenoid 11 is sufficiently inactivated to permit switch 10 to revert again to the "up" position, thereby automatically controlling the direction of current as a function of the light intensity.

The amount of current necessary to obtain the desired spectral absorption change will of course vary and is at least in part dependent upon the particular materials employed. As will be apparent to those skilled in the art, the requisite voltage for a given arrangement of elements may be ascertained by routine experimentation.

By way of illustration, in a system employing 5-nitrosalicylaldehyde partial acetal of polyvinyl alcohol as the non-migratory material, 1.5 volts was found sufficient to effect color changes.

It will also be apparent that the speed at which the change in spectral absorption characteristics occurs is dependent at least in part by the voltage impressed, so that the speed of change is in part directly proportional to the voltage. In other words, at relatively low voltages the reaction time is slower than at higher voltages.

Thus in a system employing the aforementioned partial acetal, in order to get a density of 1.0, 5 amp. sec./sq. cent. may be required.

Other factors such as the conductivity of the particular electrodes employed will likewise affect the speed of reaction.

At relatively high voltages, it has been found that the system may ultimately be impaired by hydrolysis or electrolysis and the consequent evolution of gas and/or unwanted changes at the electrodes. If the particular voltages employed present such a problem, it is within the scope of the invention to tie up or inactivate the free ions so as to avoid the evolution of gas at the electrodes. This may be accomplished, for example, by positioning at either or both electrodes an appropriate ion exchange resin which is preferably substantially colorless. For example, a basic ion exchange resin, e.g., an ion exchange resin containing basic aliphatic amine groups, may be positioned adjacent the anode to tie up the anions migrating thereto. When the flow of current is reversed, these anions are liberated and are free to migrate to the opposite electrode. Where desired, either or both ion exchange resins may also possess a color which may be the same or differnet. Such ion exchange resins are per se well known in the art.

As was heretofore mentioned, non-migratory materials which will react with a migratory material to change the spectral absorption characteristics of the migratory material are also within the scope of the present invention. The use of this combination of materials will now be described with reference to the variable light filter of FIGURE 1.

In this embodiment, material 4 comprises a layer of a suitable acid, e.g., sulfonic acids, which may be anchored at electrode 3 as an acidic polymer. A polymeric base, e.g., a polymer containing recurring amino groups, may be provided at electrode 2. Electrolyte 5 comprises a solution of an ionizable salt of a suitable metal such as lead which is customarily employed in electroplating. When current is impressed so that electrode 2 is the cathode, the metal ions migrate thereto and are deposited thereon as the free metal to provide a light filter. When the direction of current flow is reversed, the metal ions migrate to electrode 3 where they react with the acid associated therewith in material 4 to form a salt exhibiting different spectral absorption characteristics than the free metal, e.g., a colorless metal salt.

Thus, whether or not free metal is deposited to provide a filter is determined by the direction of current flow.

It will be apparent that the arrangement of elements shown in FIGURE 1 is by way of illustration only and various changes may be made without departing from the scope of the invention herein described.

For example, the non-migratory material may be positioned adjacent either of the electrodes, or if found desirable or expedient to do so two or more non-migratory materials, preferably possessing different spectral absorption characteristics, may be employed at the same electrode.

It is also contemplated that the non-migratory material may be provided with a non-permeable transparent support on one side thereof and positioned at some point in between and in spaced relationship with the electrodes. The non-permeable transparent support, which may be glass or the like, may face either of the electrodes, depending upon the system employed, whereby ions flowing in the electrolytic solution will contact only one surface of the non-migratory material. It will of course be apparent that such a device will function the same as the device illustrated in FIGURE 1.

In the filtering devices heretofore described only one non-migratory material or mixture of non-migratory materials is employed. This material or mixture of materials is positioned at one of the electrodes or, if provided with a non-permeable transparent support, at some point in between and in spaced relationship with the electrodes.

Figure 2:
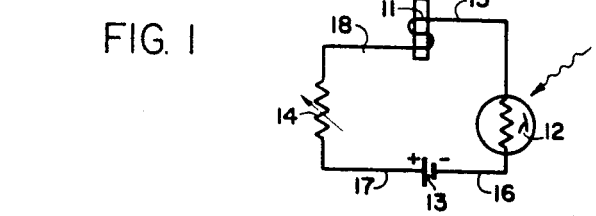
FIG. 2 is a similar view illustrating another variable filter.
Figure 2:
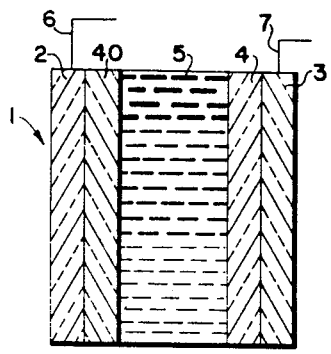

It is also within the scope of the invention to provide a variable filter containing more than one separate non-migratory material. Such a filtering device is illustrated in FIG. 2, wherein a pair of non-migratory materials 4 and 40 are provided adjacent electrodes 3 and 2, respectively.

Materials 4 and 40 may possess or be capable of possessing the same or different spectral absorption characteristics, e.g., they may be of the same or of different color.

In such a system, it is possible to obtain a more efficient utilization of a given voltage than is possible with a filtering device such as is illustrated in FIGURE 1.

For example, let us assume that one wishes to obtain a variable red filter, e.g., a filter that is either colorless or red, depending upon the flow of current. In this event, material 4 may be one of the pH-sensitive compounds which is colorless in an acid environment and red in an alkaline environment, or a leuco dye which is colorless in the oxidized state and red in the reduced state; and material 40 may be a pH-sensitive compound which is colorless in a basic environment and red in an acid environment.

When current is impressed so that electrode 2 is the cathode and 3 the anode, both materials 4 and 40 are colorless and device 1 is transparent. When the current flow is reversed so that electrode 2 is the anode and 3 the cathode, both materials 4 and 40 become red to provide a red filter, the light transmission characteristics of which are a function of both non-migratory materials.

In the filtering devices previously described, the electrodes are shown to be in parallel relationship with one another. In lieu of this arrangement, the electrodes may obviously be positioned in different relationship with one another, e.g., perpendicular to one another, one electrode coiled around or surrounding the other with the electrolyte therebetween, etc. In such variations, suitable transparent means may be employed to confine the electrolyte.

In the embodiments heretofore described, a pair of electrodes have been employed. However, it is within the scope of this invention to provide variable filters employing more than two electrodes.

Figure 3:
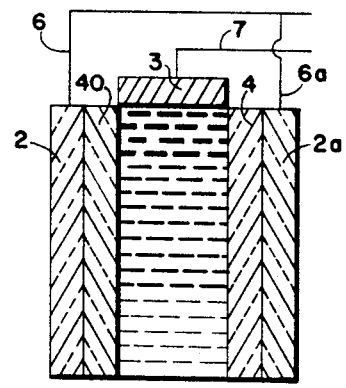
FIG. 3 is a similar view illustrating yet another variable filter.

In FIG. 3, there is shown a variable filter having three electrodes, two of the electrodes being in parallel relationship with one another, the third being substantially perpendicular to the first two electrodes and out of the field of transmittancy of the filter.

As in the embodiment illustrated in FIGURE 1, leads 6 and 7 are connected to a suitable source of current. Lead 6a connects electrode 2a to lead 6, so that electrodes 2 and 2a will be of the same potential when current is impressed. Electrode 3, which need not be transparent as it lies beyond the field of transmittancy of the filter, is connected by means of lead 7 to the current source, all, for example, as illustrated in FIGURE 1.

A variable filter of this arrangement of elements permits a wide variety of optical effects, merely by controlling the current flow through the system.

In one embodiment, materials 4 and 40 are identical in their spectral absorption characteristics so as to provide a variable filter similar in some respects to the filter of FIG. 2. For example, a pH-sensitive material which is colorless in an acid environment and possesses a given color in an alkaline environment may be employed as materials 4 and 40. When current is impressed in one direction, both electrodes 2 and 2a are anodes so that materials 4 and 40 are colorless. When the direction of current flow is reversed, both electrodes 2 and 2a become cathodes, so that both materials 4 and 40 become of the same color.

By means of suitable wiring, switches and the like (not shown), either of electrodes 2 and 2a may be disconnected, so that current may be caused to flow to only one of electrodes 2 and 2a. Thus, it is possible to provide a filter of varying density merely by connecting or disconnecting one of the electrodes. For example, if lead 6a is disconnected, the filtering ability of the system will be a function only of the density of the filter produced at electrode 2. By reconnecting lead 6a, the density is increased due to the light absorption now provided at electrode 2a. Obviously, the connecting and disconnecting may be controlled either manually or automatically.

Where materials 4 and 40 are different, e.g., when they are transparent in one environment and exhibit different spectral absorption characteristics in another environment, three different colored filters may be obtained. Where both electrodes 2 and 2a are connected so that materials 4 and 40 exhibit a color, the resulting filter will be a product of the absorption characteristics of both materials. Alternatively either electrode may be disconnected to provide a filter of the absorptive characteristics of the color-providing material associated with the active of electrodes 2 and 2a.

A variable filter of this nature is potentially useful as an automatic correcting filter for use in color photography, e.g., a filter which will shift automatically to blue for indoor photography and to amber in daylight or open sky.

Other variations in structuree will be readily apparent in view of the foregoing description.

The light-filtering devices of this invention are capable of a variety of different uses in which a stable, uniform, instantaneously variable light filter is desirable or necessary.

They may be employed, for example, in variable density windows for controlling the amount of light entering a room or other enclosure. For example, where it is desired that the amount of sunlight entering a room be kept rather constant to prevent glare or eye discomfort resulting from sudden changes in brightness due to variations in light transmission from an external source, e.g., sunlight, the device of the present invention may be preset to control and to maintain automatically at a relatively constant level the amount of light transmission. Thus, in maximum brightness, a maximum amount of current may be generated to provide a variable filter with maximum light absorption characteristics. Conversely, in minimal brightness the flow of current may be automatically reversed to render the filtering device instantaneously light transmittant. At intermediate levels of light intensity, the amount of current generated may be proportionately less than maximum to provide a light filter exhibiting absorption characteristics correspondingly less than the maximum obtainable.

The variable filters of this invention have been found to be particularly useful in variable density windows for controlling the amount of light entering a room since, unlike prior devices, they provide a substantially uniform filter over a large area.

Figure 4:
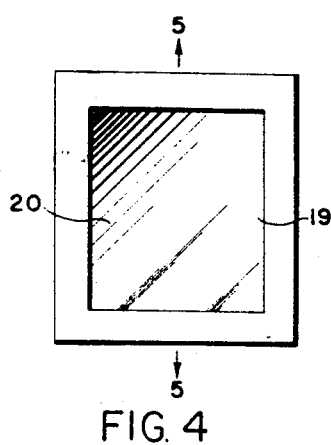
FIG. 4 is a plan view illustrating a variable density window prepared in accordance with the present invention.
Figure 5:
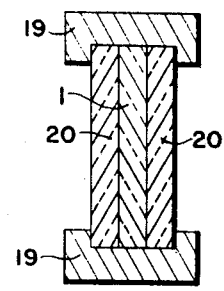
FIG. 5 is a partially schematic vertical sectional view taken along lines 5—5 of FIG. 4.

A typical variable density window of the foregoing description is illustrated in FIGS. 4 and 5.

As shown therein, the variable density window comprises a recessed or grooved frame or mount 19 of a suitable non-conductive material such as wood confining the novel filtering device 1 of this invention sandwiched or laminated between a pair of transparent non-conductive protecting plates 20 of glass or other transparent plastic. It will be appreciated that filter 1 is connected to a suitable source of current by leads (not shown) passing through frame 19.

Where found expedient or desirable to do so, filter 1 and plates 20 may be laminated together at the top and bottom by means of a suitable bonding material to provide a unitary structure. Suitable bonding materials such as plasticized, polymerized, incomplete, polyvinyl acetal resin, vinyl acetate, methyl methacrylate, etc., will be readily suggested to those skilled in the art. It is also contemplated that a pair of filtering devices, each with its own protective plate or plates, may be provided on either side of frame 19 in which event the two elements may have an air space therebetween.

Other variations and modifications will be apparent.

A variable density window of the foregoing description is potentially useful to control the light transmitted into various enclosures other than a room. For example, the variable density window of this invention may be employed in lieu of the shutter blade in cameras or the like in order to control photo exposure. Such a system makes it potentially possible to expose a photosensitive element confined therein over a wider range of light intensities than has heretofore been possible.

The present invention is also particularly useful in systems for providing non-glare and fog-penetrating headlamps for vehicles. It is contemplated that the present invention may be employed in automobiles and the like whereby by applying an electric current in a given direction the headlaps may be instantaneously rendered non-dazzling and/or fog-penetrating. When the direction or flow of current is reversed, the headlamp permits light to pass in much the usual way. The vehicle battery may be employed as the source of current and the direction of current flow may be controlled either manually by the occupant or automatically by a photoelectric cell or the like adapted in the manner illustrated in FIGURE 1, to reverse the flow of current when motivated by the light from an oncoming vehicle.

Figure 6:
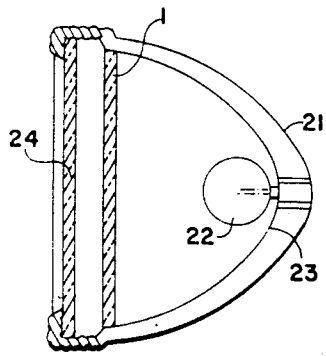
FIG. 6 is a somewhat schematic sectional view showing the use of the present invention in vehicle headlamps.
Figure 7:
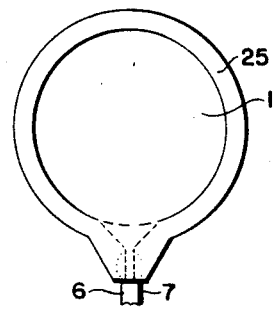
FIG. 7 is a plan view of one embodiment of the invention as adapted for use in headlamps.

FIGS. 6 and 7 illustrate somewhat schematically a head lamp of this invention.

As shown therein, a typical headlamp 21 has a light bulb 22, a reflector 23 and a transparent protective cover 24 of glass or the like. The variable light filter 1 which may be mounted in a frame 25 or the like is positioned at some point between bulb 22 and cover 24. Frame 25 is provided with a suitable opening through which leads 6 and 7 extend. As was indicated previously, leads 6 and 7 are connected to suitable external source of curent e.g., the vehicle battery, although the headlamp assembly of this invention may be provided with its own source of current if desired.

In use, the headlamp is normally substantially similar to conventional headlamps in terms of the transmittance of light emitted fom bulb 22. In other words, with a variable filter such as illustrated in FIGURE 1, non-migratory material 4 is substantially transparent. However, when current is caused to flow in the opposite direction, material 4 becomes colored to render the light transmitted non-dazzling and fog-penetrating.

The color of material 4 will of course be dependent upon its chemical composition, as indicated heretofore, and may for example be organge or amber. Upon reversal of the flow of current, material 4 once more becomes substantially transpartent so that light emitted from bulb 22 is again transmitted in much the conventional manner.

The present invention is also useful in electrolytic photographic processes for image formation or translation, particularly in the field of document duplication.

Figure 8:
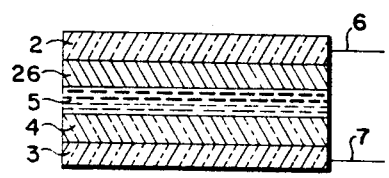
FIG. 8 is a partially diagrammatic, partially sectional view illustrating the use of the present invention in elements for preparing visible images.
Figure 9:
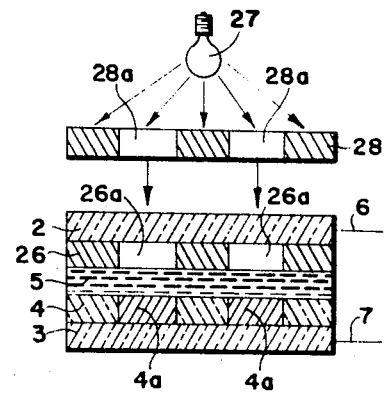
FIG. 9 is a similar view showing the preparation of a visible image with the element of FIG. 8.
Figure 10:
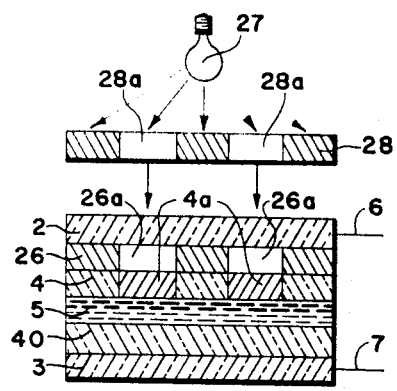
FIG. 10 is a view similar to FIG. 9 showing another device for preparing visible images in accordance with this invention.

FIGS. 8–10 illustrate this aspect of the present invention.

As shown in FIG. 8, a photographic unit of this invention may comprise, in order, a first transparent electrode 2, a photoconductive layer 26, electrolytic solution 5, non-migratory material 4, and a second electrode 3.

Photoconductive layer 26 comprises a layer of a photoconductive material, e.g., a material which is rendered electrically conductive in its transverse direction only upon exposure to light. Materials having this characteristic and their preparation are well known in the art and per se comprise no part of the present invention. As examples of such materials, mention may be made of cadmium sulfide, zinc oxide, selenium, etc.

FIG. 9 illustrates the use of the photographic unit of FIG. 8.

A document or other object 28 to be reproduced having transparent areas 28a is placed between a suitable source of light 27 and the photographic unit. Light passing through areas 28a render corresponding areas 26a of photoconductive layer 26 electrically conductive. In other words, layer 26 is rendered electrically conductive in terms of exposed areas, while unexposed areas remain non-conductive. This imagewise conductivity is employed to provide a visible image in the following manner.

When electric current is impressed, the imagewise migration of ions in electrolyte 5 causes an imagewise change in the spectral absorption characteristics of material 4 in areas 4a. If material 4 is an initially colored material which is bleached by impressing the current, a positive image will be formed; while if material 4 is an initially transparent material or of a relatively low covering power which is colored or caused to possess a relatively high covering power by impressing the current, a negative image will be obtained.

Subsequent to image formation, the current may either be left on or switched off and the resulting image viewed by reflection through transparent electrode 3.

Where material 4 is a molecularly oriented plastic material, as described and claimed in the aforementioned copending application Ser. No. 350,250, a polarizing image is obtained which is particularly useful in advertising displays and the like relying for its appeal upon unusual optical effects.

Regardless of the composition of material 4, an interesting optical effect may be obtained by rythmically alternating the flow of current, so that the image is alternately visible and invisible.

Various changes may be made in the structure of the photographic unit illustrated in FIG. 8 without departing from the scope of the invention.

For example, it is contemplated that a metal layer could be placed on the back of the photoconductive layer to facilitate viewing of the image by reflection. It is also contemplated that a light-absorbing element may be placed between electrode 3 and the photoconductive layer to prevent unwanted changes in conductivity of layer 26 resulting from viewing light entering the back of the photographic unit through electrode 3. The prevention of viewing light entering the back of the unit and a suitable background for viewing by reflected light may also be obtained by including an opaque pigment, preferably black, in the electrolytic solution.

In lieu of viewing the image formed on material 4, the image may be translated by reflected light through appropriate optical devices and viewed through viewing box or projected on a screen. Such viewing procedures for translating an image are well known in the art and permit the image formed in the photographic unit to be greatly enlarged, as well as facilitating viewing by one or a plurality of persons.

It will be appreciated that the image formed as a result of an imagewise change in spectral absorption characteristics in material 4 may be "erased" by subjecting photoconductive layer 26 to an overall exposure.

Assuming for example that the image was formed initially in the foregoing manner by effecting an imagewise change in material 4 from colorless to a color in exposed areas to form a negative image, the image may be "erased" by continuing the flow of current in the same direction and subjecting photoconductive layer 26 to an over-all exposure, say, for example, from a suitable source of light positioned above transparent electrode 2. This over-all exposure will of course render photoconductive layer 26 uniformly conductive which in turn causes a uniform change in the spectral absorption characteristics of material 4 from colorless to colored.

The flow of current may be reversed while the over-all exposure is performed, so that layer 4 becomes uniformly colorless. In other words, the "erasing" of the image may render material 4 either uniformly colored or colorless, depending upon the direction of current flow.

Once the image has been "erased," a new image may be formed and the unit used repeatedly.

An interesting optical effect may be obtained by rhythmically forming an image by selectively exposing the unit through transparency 28, subjecting the photoconductive layer to an over-all exposure to "erase" the image; reversing the flow of current while re-exposing through transparency 28, subjecting to a second over-all exposure, and repeating the cycle.

Assuming that the image formed initially is a negative image obtained by an imagewise change in material 4 from colorless to a color in terms of exposed areas, the first over-all exposure renders material 4 uniformly colored, as heretofore noted, and the subsequent reversal of current flow while selectively re-exposing through the original subject matter permits an imagewise change from color to colorless in material 4 in terms of exposed areas to provide a positive image. Thus, it is possible to form rhythmically first a negative and then a positive image.

The second exposure may also be of a different subject matter (which may have a different light source associated therewith) to provide different rhythmically alternating images. In this manner, the effect of motion may be created.

Other variations will be readily suggested.

FIG. 10 illustrates another embodiment of the photographic unit of this invention.

As shown therein, a pair of opposed non-migratory materials 4 and 40 are separated by the electrolyte. These non-migratory materials may, for example, be acid-base indicators such as the polymeric indicators previously described which are colorless in an acid medium and colored in an alkaline medium.

Image formation is accomplished in the manner illustrated in FIG. 9, except that when the direction of the flow of current is rhythmically alternated, an interesting optical effect is obtained.

When current flows to electrode 7 so that electrode 6 becomes the cathode, the migration of cations to the cathode produces an alkaline environment which causes areas 4a of material 4 to become colored, e.g., be yellow. Material 40 is colorless due to the acidic environment.

Upon reversing the direction of current flow, material 4 becomes colorless and an imagewise color, e.g., red, is formed in the areas of material 40 corresponding to areas 4a of material 4.

In other words, with a photographic unit such as is illustrated in FIG. 8, it is possible to obtain a color reproduction which repeatedly changes from one color to another, thereby creating an appealing optical effect for advertisng displays and the like.

In the foregoing description of the many uses of the novel variable filter of this invention, a single such filter has been employed. It is contemplated that a plurality of such filters may be employed, if desired. For example, two or more filters may be connected in series to provide increased density.

While certain preferred uses of the variable filters of this invention have been described and shown in the foregoing description and illustrative drawings, these filters are capable of other uses.

One such potential use is in subtractive color television systems, since by the present invention it is potentially feasible to reduce the number of color filters necessary to reproduce a multicolor image on the television screen.

Another potential use is the control of heat in enclosures. For example, an elevation in temperature within an enclosure may be provided by forming a black filter which will absorb light and heat. Conversely, cooling of the enclosure may be obtained by forming a white filter which reflects radiation to preclude radiational heating. Other potential applications may be readily suggested to those skilled in the art of heat control.

Since certain changes may be made in the above apparatus, product and process without departing from the scope of the invention herein involved, it is intended that all matter contained in the above description or shown in the accompanying drawings shall be interpreted as illustrative and not in a limiting sense.

What is claimed is:

1. A light-filtering device comprising a layer of non-migratory material having reversibly alterable spectral absorption characteristics; an electrolytic solution in contact with one surface of said layer of non-migratory material and containing migratory means activated by the flow of an electric current for altering the spectral absorption characteristics of said material; and means for flowing an electric current in a predetermined direction through said solution.

2. A variable light-filtering device comprising a first light-transmitting electrode; a second light-transmitting electrode parallel to, coextensive with, and spaced apart from said first electrode; an electrolytic solution confined between said electrodes; a layer of non-migratory material having reversibly alterable spectral absorption characteristics parallel to, substantially coextensive with and positioned between said electrodes; said layer of non-migratory material having only one of its surfaces in direct contact with said electrolytic solution, said solution containing migratory means activated by the flow of an electric current for altering the spectral absorption characteristics of said non-migratory material; means for flowing an electric current in a predetermined direction through said device; and means for reversing the direction of the flow of current.

3. A device as defined in claim 2 wherein said layer of non-migratory material has one surface in juxtaposition with the inner surface of one of said electrodes.

4. A device as defined in claim 3 including a second layer of non-migratory material having reversibly alterable spectral absorption characteristics parallel to and substantially coextensive with said first-mentioned layer and having one surface in juxtaposition with the inner surface of the other of said electrodes.

5. A device as defined in claim 4 including a third electrode in contact with said electrolytic solution and positioned outside and substantially adjacent the field of light transmittancy of said first and second electrodes, and means for maintaining said first and second light-transmitting electrodes at the same potential and said third electrode at a different potential.

6. A device as defined in claim 2 wherein said electrolytic solution contains ions for altering the spectral absorption characteristics of said non-migratory material.

7. A device as defined in claim 3 wherein said electrolytic solution contains migratory means for plating on the inner surface of the other of said electrodes when current is impressed in a given direction, thereby altering the light transmittance at said electrode, said means being deplatable when the direction of current flow is reversed, said non-migratory means being reversibly reactable with said migratory plating means for reversibly altering the spectral absorption characteristics of said plating means migrating thereto during said reversed current flow.

8. In an enclosure provided with transparent means for emitting light from an external source into said enclosure, the improvement which comprises positioning in coextensive relationship with said transparent means, a variable light-filtering device as defined in claim 2.

9. In an enclosure provided with transparent means for emitting light from an external source into said enclosure, the improvement which comprises positioning in coextensive relationship with said transparent means, a variable light-filtering device as defined in claim 7.

10. In a vehicle headlamp assembly including a light bulb and a protective transparent cover, the improvement which comprises positioning in coextensive relationship with said transparent cover a variable light-filtering device as defined in claim 2.

11. A photographic device for forming visible images which comprises sheet material means having reversibly alterable spectral absorption characteristics; an electrolytic solution in contact with one surface of said sheet material and containing migratory means activated by the flow of an electric current for altering the spectral absorption characteristics of said sheet material in an imagewise pattern to form a visible image thereon; and means for alternately flowing an electric current through said solution for repeatedly removing said image and forming successive images on said sheet material.

12. A photographic device for preparing visible images comprising a first transparent electrode; a second transparent electrode parallel to, coextensive with and spaced apart from said first electrode; an electrolytic solution confined between said electrodes; a photoconductive material in a layer parallel to, coextensive with and in juxtaposition with the inner surface of one of said electrodes; a non-migratory material having reversibly alterable spectral absorption characteristics in a layer parallel to and substantially coextensive with said photoconductive material in juxtaposition with the inner surface of the other of said electrodes; means for flowing an electric current through said device and means for reversing the direction of flow of current, said electrolytic solution containing migratory means activated by the flow of an electric current for altering the spectral absorption characteristics of said non-migratory material.

13. A photographic device as defined in claim 12 including a second layer of non-migratory material having reversibly alterable spectral absorption characteristics parallel to, substantially coextensive with and in juxtaposition with said layer of photoconductive material on the inner surface thereof and wherein said migratory means is capable of altering the spectral absorption characteristics of one of said non-migratory materials when current flows in a given direction and is capable of altering the spectral absorption characteristics of the other of said non-migratory materials when the direction of current flow is reversed.

14. A process for forming visible images comprising exposing a light-sensitive element containing a material having reversibly alterable spectral absorption characteristics; forming an imagewise distribution, in terms of exposed areas, of ions for altering the spectral absorption characteristics of said material; contacting said material with said ions to form a visible image; and erasing said image.

15. A device as defined in claim 1 including means for automatically predetermining said direction of flow.

References Cited

UNITED STATES PATENTS

| | | | |
|---|---|---|---|
| 3,303,488 | 2/1963 | Anderson | 350—160 |
| 2,632,045 | 3/1953 | Sziklai | 350—160 |
| 2,927,245 | 3/1960 | Irland et al. | 350—276 |
| 3,085,469 | 4/1963 | Carlson. | |
| 3,123,724 | 3/1964 | Schrenk et al. | 250—205 |
| 3,169,163 | 2/1965 | Nassenstein | 350—160 |
| 3,253,497 | 5/1966 | Dreyer. | |
| 3,291,551 | 12/1966 | Zaromb | 350—160 |

JEWELL H. PEDERSEN, *Primary Examiner.*

W. L. SIKES, *Assistant Examiner.*

U.S. Cl. X.R.

350—312

UNITED STATES PATENT OFFICE
CERTIFICATE OF CORRECTION

Patent No. 3,443,859      Dated May 13, 1969

Inventor(s)        Howard G. Rogers

It is certified that error appears in the above-identified patent and that said Letters Patent are hereby corrected as shown below:

Column 2, line 48, for "non-mitgratory" read --non-migratory--; line 59, for "posses" read --possesses--; column 4, line 4, for "a salt" read --a lead salt--; line 20, for "different power" read --different covering power--; column 5, line 10, for "obtained" read --obtained.--; column 8, line 8, for "structuree" read --structure--; column 9, line 2, for "headlaps" read --headlamps--; column 14, line 6, for the claim reference numeral "1" read --2--.

SIGNED AND
SEALED
AUG 11 1970

(SEAL)
Attest:

Edward M. Fletcher, Jr.
Attesting Officer

WILLIAM E. SCHUYLER, JR.
Commissioner of Patents